United States Patent
Feldermann et al.

(10) Patent No.: US 8,710,127 B2
(45) Date of Patent: Apr. 29, 2014

(54) FLAME-PROTECTED IMPACT-MODIFIED POLYCARBONATE COMPOSITIONS

(75) Inventors: Achim Feldermann, Duesseldorf (DE); Thomas Eckel, Dormagen (DE); Andreas Seidel, Dormagen (DE); Dieter Wittmann, Leverkusen (DE)

(73) Assignee: Bayer Materialscience AG, Leverkusen (DE)

( * ) Notice: Subject to any disclaimer, the term of this patent is extended or adjusted under 35 U.S.C. 154(b) by 185 days.

(21) Appl. No.: 12/729,771

(22) Filed: Mar. 23, 2010

(65) Prior Publication Data

US 2010/0249290 A1    Sep. 30, 2010

(30) Foreign Application Priority Data

Mar. 25, 2009 (DE) .......................... 10 2009 014 878

(51) Int. Cl.
*C08K 5/52* (2006.01)

(52) U.S. Cl.
USPC ............................................... 524/127

(58) Field of Classification Search
USPC ............................................... 524/127
See application file for complete search history.

(56) References Cited

U.S. PATENT DOCUMENTS

| | | | |
|---|---|---|---|
| 3,553,167 A | 1/1971 | Schnell et al. | |
| 4,075,173 A | 2/1978 | Maruyama et al. | |
| 4,311,823 A | 1/1982 | Imai et al. | |
| 6,423,766 B1 | 7/2002 | Itagaki | |
| 7,834,075 B2 * | 11/2010 | Buchholz et al. | 524/405 |
| 2002/0077417 A1 | 6/2002 | Itagaki | |
| 2003/0105196 A1 * | 6/2003 | Seidel et al. | 524/127 |
| 2004/0132877 A1 * | 7/2004 | Seidel et al. | 524/115 |
| 2007/0225412 A1 * | 9/2007 | Buchholz et al. | 524/115 |
| 2008/0214731 A1 | 9/2008 | Li | |

FOREIGN PATENT DOCUMENTS

| | | |
|---|---|---|
| DE | 1 495 626 | 6/1971 |
| DE | 27 03 376 | 8/1977 |
| DE | 27 14 544 | 10/1977 |
| DE | 30 00 610 | 7/1980 |
| DE | 38 32 396 | 2/1990 |
| EP | 0 635 547 | 1/1995 |
| GB | 1552558 | 9/1979 |
| WO | 02/46306 | 6/2002 |
| WO | 2004/069914 | 8/2004 |

OTHER PUBLICATIONS

International Search Report based on PCT/EP2010/001642 dated Jun. 2, 2010.
International Preliminary Report and Written Opinion of PCT/EP2010/001642 Dated Sep. 27, 2011.

* cited by examiner

*Primary Examiner* — Doris Lee
(74) *Attorney, Agent, or Firm* — Miles & Stockbridge, PC

(57) ABSTRACT

The present invention relates to flame-protected impact-modified polycarbonate compositions, wherein the compositions are free of rubber-free polyalkyl (alkyl)acrylate. The present invention further relates to the use of the polycarbonate compositions in the production of molded bodies, and to the molded bodies themselves.

19 Claims, No Drawings

FLAME-PROTECTED IMPACT-MODIFIED POLYCARBONATE COMPOSITIONS

CROSS REFERENCE TO RELATED APPLICATIONS

This application claims priority from DE 1 02009014878.7 filed Mar. 25, 2009, the content of which is incorporated herein by reference in its entirety.

BACKGROUND OF THE INVENTION

1. Field of the Invention

The present invention relates to flame-protected impact-modified polycarbonate compositions which comprise a graft polymer containing a silicone-acrylate composite rubber and an oligophosphate based on bisphenol A and which are free of rubber-free polyalkyl (alkyl)acrylate, to the use of the polycarbonate compositions in the production of moulded bodies, and to the moulded bodies themselves.

2. Description of Related Art

WO-A 2004/069914 discloses flame-resistant polycarbonate compositions which comprise polyalkyl (alkyl)acrylate and halogen-free oligophosphates and which are free of polymers whose synthesis involves butadiene, styrene or acrylonitrile. The compositions are distinguished by good joint line strength, resistance to chemicals, dimensional stability under heat, elongation at tear and flowability. The compositions of the present invention differ from the compositions according to WO-A 2004/069914 in that the compositions according to the invention do not contain rubber-free polyalkyl (alkyl) acrylate.

WO-A 2002/046305 discloses impact-modified, flame-resistant polycarbonate compositions comprising polycarbonate, impact modifier, phosphorus-containing flameproofing agents. The compositions are distinguished by improved notched impact strength in the low-temperature range. WO-A 2002/046305 does not, however, disclose compositions containing an impact modifier having a graft base of silicone-acrylate composite rubber.

EP-A 635547 discloses flame-protected polycarbonate compositions comprising polycarbonate, a copolymer gel, an impact modifier based on acrylate or diene rubber, a flameproofing agent such as, for example, oligophosphate, and optionally an impact modifier having a graft base of diene rubber, acrylate rubber or EPDM rubber. EP-A 635547 does not, however, disclose compositions containing an impact modifier having a graft base of silicone-acrylate composite rubber.

U.S. Pat. No. 6,423,766 discloses flame-protected polycarbonate compositions having an impact modifier which has a graft base of silicone-acrylate composite rubber, wherein the weight ratio of impact modifier to phosphorus from the phosphoric acid ester is from 2 to 15. The compositions have improved mechanical properties and good processing behaviour. The compositions of the present invention differ from the compositions according to U.S. Pat. No. 6,423,766 in that the compositions according to the invention have a higher weight ratio of impact modifier to phosphorus from the phosphoric acid ester.

SUMMARY OF THE INVENTION

There was a need to improve the compositions and moulding compositions known from the prior art in respect of their balance of flame-protecting behaviour and strength, it being necessary at the same time for the compositions and moulding compositions to have high ageing stability and high dimensional stability under heat. Accordingly, it was an object of the present invention to provide ageing-stable polycarbonate compositions and moulding compositions which are distinguished by an improved balance of flame-protecting behaviour and strength while having high dimensional stability under heat.

It has been found, surprisingly, that the desired property profile is exhibited by compositions comprising A) from 77 to 90 parts by weight, preferably from 80 to 90 parts by weight, particularly preferably from 83.5 to 86.8 parts by weight (based on the sum of the parts by weight of components A+B+C), of linear and/or branched aromatic polycarbonate and/or aromatic polyester carbonate, B) from 6 to 12 parts by weight, preferably from 7 to 11 parts by weight, particularly preferably from 8.5 to 10 parts by weight (based on the sum of the parts by weight of components A+B+C), of graft polymer having B.1 from 5 to 30 wt. %, preferably from 5 to 25 wt. %, particularly preferably from 11 to 19 wt. % (in each case based on the graft polymer B), of a shell of at least one vinyl monomer and B.2 from 95 to 70 wt. %, preferably from 90 to 75 wt. %, particularly preferably from 81 to 89 wt. % (in each case based on the graft polymer B), of one or more graft bases of silicone-acrylate composite rubber, C) from 4 to 10 parts by weight, preferably from 5 to 9 parts by weight, particularly preferably from 5.2 to 6.5 parts by weight (based on the sum of the parts by weight of components A+B+C), of phosphorus compounds according to formula (VIII)

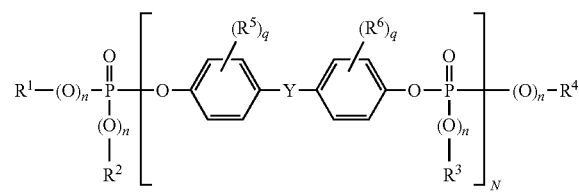

wherein

R$^1$, R$^2$, R$^3$ and R$^4$, independently of one another, represent optionally halo-substituted C$_1$-C$_8$-alkyl, in each case optionally halo- and/or alkyl-substituted C$_5$-C$_6$-cycloalkyl, C$_6$-C$_{10}$-aryl or C$_7$-C$_{12}$-aralkyl, the substituents n independently of one another represent 0 or 1, the substituents q independently of one another represent 0, 1, 2, 3 or 4, N represents from 0.1 to 10, preferably from 0.5 to 5, particularly preferably from 0.9 to 3, most preferably from 1.06 to 1.15, R$^5$ and R$^6$, independently of one another, represent C$_1$-C$_4$-alkyl, preferably methyl, or halogen, preferably chlorine and/or bromine, and Y represents a single bond, C$_1$-C$_7$-alkylidene, C$_1$-C$_7$-alkylene, C$_5$-C$_{12}$-cycloalkylene, C$_5$-C$_{12}$-cycloalkylidene, —O—, —S—, —SO—, —SO$_2$— or —CO—, D) from 0 to 3 parts by weight, preferably from 0.01 to 1 part by weight, particularly preferably from 0.1 to 0.6 part by weight (based on the sum of the parts by weight of components A+B+C), of antidripping agents, E) from 0 to 3 parts by weight, preferably from 0 to 1 part by weight (based on the sum of the parts by weight of components A+B+C), of thermoplastic vinyl (co)polymer (E.1) and/or polyalkylene terephthalate (E.2); the composition is particularly preferably free of thermoplastic vinyl (co) polymers (E.1) and/or polyalkylene terephthalates (E.2), and F) from 0 to 20 parts by weight, preferably from 0.1 to 10 parts by weight, particularly preferably from 0.2 to 5 parts by weight (based on the sum of the parts by weight of components A+B+C), of further additives, wherein the weight ratio of component B to phosphorus content from component C is in a range of from 16 to 22 to 1, preferably from 17 to 19 to 1, wherein the compositions are free of rubber-free polyalkyl (alkyl)acrylate, and wherein all part by weight data in the present application are so standardised that the sum of the parts by weight of components A+B+C in the composition is 100.

DETAILED DESCRIPTION OF A PREFERRED EMBODIMENT

Component A

Aromatic polycarbonates and/or aromatic polyester carbonates according to component A which are suitable according to the invention are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934).

The preparation of aromatic polycarbonates is carried out, for example, by reacting diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents having a functionality of three or more than three, for example triphenols or tetraphenols. Preparation via a melt polymerisation process by reaction of diphenols with, for example, diphenyl carbonate is also possible.

Diphenols for the preparation of the aromatic polycarbonates and/or aromatic polyester carbonates are preferably those of formula (I)

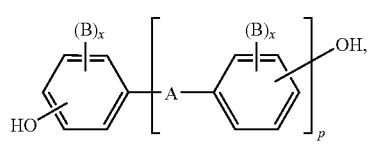

(I)

wherein

A represents a single bond, $C_1$- to $C_5$-alkylene, $C_2$- to $C_5$-alkylidene, $C_5$- to $C_6$-cyclo-alkylidene, —O—, —SO—, —CO—, —S—, —SO$_2$—, $C_6$- to $C_{12}$-arylene, to which there can be fused further aromatic rings optionally containing heteroatoms, or a radical of formula (II) or (III)

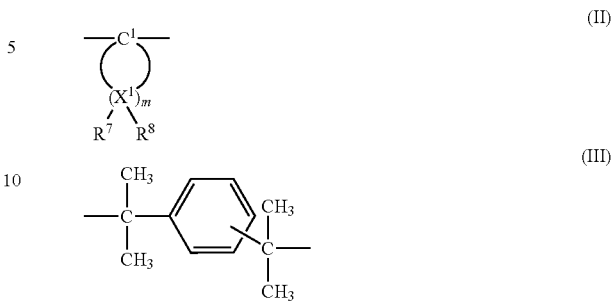

each of the substituents B represents $C_1$- to $C_{12}$-alkyl, preferably methyl, halogen, preferably chlorine and/or bromine, the substituents x are each independently of the other 0, 1 or 2, p represents 1 or 0, and $R^7$ and $R^8$ can be chosen individually for each $X^1$ and are each independently of the other hydrogen or $C_1$- to $C_6$-alkyl, preferably hydrogen, methyl or ethyl, $X^1$ represents carbon, and m represents an integer from 4 to 7, preferably 4 or 5, with the proviso that on at least one atom $X^1$, $R^7$ and $R^8$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes and their derivatives brominated and/or chlorinated on the ring.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-di-hydroxydiphenylsulfone and di- and tetra-brominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. Particular preference is given to 2,2-bis-(4-hydroxyphenyl)-propane (bisphenol A). The diphenols can be used individually or in the form of arbitrary mixtures. The diphenols are known in the literature or obtainable according to processes known in the literature.

Suitable chain terminators for the preparation of the thermoplastic, aromatic polycarbonates are, for example, phenol, p-chlorophenol, p-tert-butylphenol or 2,4,6-tribromophenol, as well as long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % mol % to 10 mol % mol %, based on the molar sum of the diphenols used in a particular case.

The thermoplastic, aromatic polycarbonates have mean weight-average molecular weights ($M_w$, measured, for example, by GPC, ultracentrifugation or scattered light measurement) of from 10,000 to 200,000 g/mol, preferably from 15,000 to 80,000 g/mol, particularly preferably from 24,000 to 32,000 g/mol.

The thermoplastic, aromatic polycarbonates can be branched in known manner, preferably by the incorporation of from 0.05 to 2.0 mol %, based on the sum of the diphenols used, of compounds having a functionality of three or more than three, for example those having three or more phenolic groups.

Both homopolycarbonates and copolycarbonates are suitable. For the preparation of copolycarbonates according to the invention of component A there can also be used from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared by processes known in the literature. The preparation of polydiorganosiloxane-containing copolycarbonates is described in DE-A 3 334 782.

Preferred polycarbonates, in addition to the bisphenol A homopolycarbonates, are the copolycarbonates of bisphenol A having up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

There come into consideration as chain terminators for the preparation of the aromatic polyester carbonates, in addition to the monophenols already mentioned, also the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-mono-carboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein. The aromatic polyester carbonates can be both linear and branched in a known manner (see in this connection DE-A 2 940 024 and DE-A 3 007 934).

As branching agents there can be used, for example, carboxylic acid chlorides having a functionality of three or more, such as trimesic acid trichloride, cyanuric acid trichloride, 3,3'-,4,4'-benzophenone tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used) or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in the reaction vessel with the diphenols; acid chloride branching agents can be introduced together with the acid dichlorides.

The proportion of carbonate structural units in the thermoplastic, aromatic polyester carbonates can vary as desired. The proportion of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range from 1.18 to 1.4, preferably from 1.20 to 1.32 (measured on solutions of 0.5 g of polycarbonate or polyester carbonate in 100 ml of methylene chloride solution at 25° C.).

The thermoplastic, aromatic polycarbonates and polyester carbonates can be used on their own or in an arbitrary mixture.

Component B

The graft polymers B are prepared by free-radical polymerisation, for example by emulsion, suspension, solution or mass polymerisation, preferably by emulsion or mass polymerisation.

Suitable monomers B.1 are vinyl monomers such as vinyl aromatic compounds and/or vinyl aromatic compounds substituted on the ring (such as styrene, α-methylstyrene, p-methylstyrene, p-chlorostyrene), methacrylic acid ($C_1$-$C_8$)-alkyl esters (such as methyl methacrylate, ethyl methacrylate, 2-ethylhexyl methacrylate, allyl methacrylate), acrylic acid ($C_1$-$C_8$)-alkyl esters (such as methyl acrylate, ethyl acrylate, n-butyl acrylate, tert-butyl acrylate), organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenyl-maleimide). These vinyl monomers can be used alone or in mixtures of at least two monomers.

Preferred monomers B.1 are selected from at least one of the monomers styrene, α-methylstyrene, methyl methacrylate, n-butyl acrylate and acrylonitrile. Particular preference is given to the use of methyl methacrylate as the monomer B.1.

The glass transition temperature of the graft base B.2 is <10° C., preferably <0° C., particularly preferably <−20° C. The graft base B.2 generally has a mean particle size ($d_{50}$ value) of from 0.05 to 10 μm, preferably from 0.06 to 5 μm, particularly preferably from 0.08 to 1 μm.

The mean particle size $d_{50}$ is the diameter above and below which in each case 50 wt. % of the particles lie. It can be determined by means of ultracentrifuge measurement (W. Scholtan, H. Lange, Kolloid-Z. and Z. Polymere 250 (1972), 782-796).

According to the invention, silicone-acrylate composite rubber is used as the graft base B.2. Such silicone-acrylate composite rubbers are preferably composite rubbers having graft-active sites containing from 10 to 90 wt. % silicone rubber component and from 90 to 10 wt. % polyalkyl (meth) acrylate rubber component, the two mentioned rubber components in the composite rubber interpenetrating so that they cannot substantially be separated.

If the proportion of silicone rubber component in the composite rubber is too high, the finished resin compositions have disadvantageous surface properties and an impaired colouring capacity. If, on the other hand, the proportion of the polyalkyl (meth)acrylate rubber component in the composite rubber is too high, the impact strength of the finished resin composition is adversely affected.

Silicone-acrylate composite rubbers are known and are described, for example, in U.S. Pat. No. 5,807,914, EP 430134 and U.S. Pat. No. 4,888,388.

Suitable silicone rubber components B.2.1 for the silicone-acrylate composite rubbers according to B.2 are silicone rubbers having graft-active sites, the preparation method of which is described, for example, in U.S. Pat. No. 2,891,920, U.S. Pat. No. 3,294,725, DE-OS 3 631 540, EP 249964, EP 430134 and U.S. Pat. No. 4,888,388.

The silicone rubber according to B.2.1 is preferably prepared by emulsion polymerisation, in which siloxane monomer structural units, crosslinking or branching agents (IV) and optionally grafting agents (V) are used.

The siloxane monomer structural units used are, for example and preferably, dimethylsiloxane or cyclic organosiloxanes having at least 3 ring members, preferably from 3 to 6 ring members, such as, for example and preferably, hexamethylcyclotrisiloxane, octamethylcyclotetrasiloxane, decamethylcyclopentasiloxane, dodecamethylcyclohexasiloxane, trimethyl-triphenyl-cyclotrisiloxane, tetramethyl-tetraphenyl-cyclotetrasiloxane, octaphenylcyclotetrasiloxane.

The organosiloxane monomers can be used alone or in the form of mixtures having 2 or more monomers. The silicone rubber preferably contains not less than 50 wt. % and particularly preferably not less than 60 wt. % organosiloxane, based on the total weight of the silicone rubber component.

As crosslinking or branching agents (IV) there are preferably used silane-based crosslinking agents having a functionality of 3 or 4, particularly preferably 4. Preferred examples which may be mentioned include: trimethoxymethylsilane, triethoxyphenylsilane, tetramethoxysilane, tetraethoxysilane, tetra-n-propoxysilane and tetrabutoxysilane. The crosslinking agent can be used alone or in a mixture of two or more crosslinking agents. Tetraethoxysilane is particularly preferred.

The crosslinking agent is used in an amount in the range from 0.1 to 40 wt. %, based on the total weight of the silicone rubber component. The amount of crosslinking agent is so chosen that the degree of swelling of the silicone rubber, measured in toluene, is from 3 to 30, preferably from 3 to 25 and particularly preferably from 3 to 15. The degree of swelling is defined as the weight ratio of the amount of toluene absorbed by the silicone rubber when it is saturated with toluene at 25° C., and the amount of silicone rubber in the dry state. The determination of the degree of swelling is described in detail in EP 249964.

If the degree of swelling is less than 3, that is to say if the content of crosslinking agent is too high, the silicone rubber does not exhibit adequate rubber elasticity. If the swelling index is greater than 30, the silicone rubber is unable to form a domain structure in the matrix polymer and therefore cannot improve impact strength; the effect would then be similar to the simple addition of polydimethylsiloxane.

Tetrafunctional crosslinking agents are preferred over trifunctional crosslinking agents because the degree of swelling is then simpler to control within the above-described limits.

Suitable grafting agents (V) are compounds that are capable of forming structures of the following formulae:

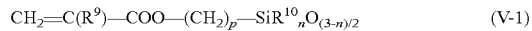

$$CH_2=C(R^9)-COO-(CH_2)_p-SiR^{10}_nO_{(3-n)/2} \quad (V-1)$$

$$CH_2=CH-SiR^{10}_nO_{(3-n)/2} \quad (V-2) \text{ or}$$

$$HS-(CH_2)_p-SiR^{10}_nO_{(3-n)/2} \quad (V-3)$$

wherein $R^9$ represents hydrogen or methyl, $R^{10}$ represents $C_1$-$C_4$-alkyl, preferably methyl, ethyl or propyl, or phenyl, n represents 0, 1 or 2 and p represents an integer from 1 to 6.

Acryloyl- or methacryloyl-oxysilanes are particularly suitable for forming the above-mentioned structure (V-1), and they have high grafting efficiency. As a result, effective formation of the graft chains is ensured, and accordingly the impact strength of the resulting resin composition is favourably influenced. Preferred examples which may be mentioned include: β-methacryloyloxy-ethyldimethoxymethyl-silane, γ-methacryloyloxy-propylmethoxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, δ-methacryloyl-oxybutyldiethoxymethyl-silane or mixtures thereof.

From 0 to 20 wt. % of grafting agent are preferably used, based on the total weight of the silicone rubber.

The silicone rubber can be prepared by emulsion polymerisation, as described, for example, in U.S. Pat. No. 2,891,920 and U.S. Pat. No. 3,294,725. The silicone rubber is thereby obtained in the form of an aqueous latex. To that end, a mixture containing organosiloxane, crosslinking agent and optionally grafting agent is mixed with water, under shear, for example by means of a homogeniser, in the presence of an emulsifier based on sulfonic acid, such as, for example, alkylbenzenesulfonic acid or alkylsulfonic acid, the mixture polymerising completely to form the silicone rubber latex. An alkylbenzenesulfonic acid is particularly suitable because it acts not only as emulsifier but also as polymerisation initiator. In this case, a combination of the sulfonic acid with a metal salt of an alkylbenzenesulfonic acid or with a metal salt of an alkylsulfonic acid is advantageous because the polymer is thereby stabilised during the subsequent graft polymerisation.

After the polymerisation, the reaction is terminated by neutralising the reaction mixture by addition of an aqueous alkaline solution, for example by addition of an aqueous sodium hydroxide, potassium hydroxide or sodium carbonate solution.

Suitable polyalkyl (meth)acrylate rubber components B.2.2 of the silicone-acrylate composite rubbers according to B.2 can be prepared from methacrylic acid alkyl esters and/or acrylic acid alkyl esters, a crosslinking agent (VI) and a grafting agent (VII). Examples of preferred methacrylic acid alkyl esters and/or acrylic acid alkyl esters are the $C_1$- to $C_8$-alkyl esters, for example methyl, ethyl, n-butyl, tert-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, as well as mixtures of these monomers. n-Butyl acrylate is particularly preferred.

As crosslinking agents (VI) for the polyalkyl (meth)acrylate rubber component of the silicone-acrylate rubber there can be used monomers having more than one polymerisable double bond. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Examples of preferred grafting agents (VII) are allyl methacrylate, triallyl cyanurate, triallyl isocyanurate or mixtures thereof. Allyl methacrylate can also be used as crosslinking agent (VI). The grafting agents can be used alone or in mixtures of at least two grafting agents.

The amount of crosslinking agent (VI) and grafting agent (VII) is from 0.1 to 20 wt. %, based on the total weight of the polyalkyl (meth)acrylate rubber component of the silicone-acrylate rubber.

The silicone-acrylate rubber is produced by first preparing the silicone rubber according to B.2.1 as an aqueous latex. The latex is subsequently enriched with the methacrylic acid alkyl esters and/or acrylic acid alkyl esters that are to be used, the crosslinking agent (VI) and the grafting agent (VII), and polymerisation is carried out. Preference is given to emulsion polymerisation initiated by free radicals, for example by a peroxide, azo or redox initiator. Particular preference is given to the use of a redox initiator system, in particular a sulfoxylate initiator system prepared by combining iron sulfate, disodium ethylenediamine tetraacetate, rongalite and hydroperoxide.

The grafting agent (V) used in the preparation of the silicone rubber has the effect that the polyalkyl (meth)acrylate rubber component is bonded covalently to the silicone rubber component. In the polymerisation, the two rubber components interpenetrate and thus form the composite rubber, which after the polymerisation can no longer be separated into its constituents of silicone rubber component and polyalkyl (meth)acrylate rubber component.

For the preparation of the silicone-acrylate composite graft rubbers B mentioned as component B), the monomers B.1 are grafted onto the rubber base B.2.

The polymerisation methods described, for example, in EP 249964, EP 430134 and U.S. Pat. No. 4,888,388 can be used for that purpose.

For example, the graft polymerisation is carried out according to the following polymerisation method: In a single- or multi-step emulsion polymerisation initiated by free radicals, the desired vinyl monomers B.1 are polymerised onto the graft base, which is in the form of an aqueous latex. The grafting efficiency should be as high as possible and is preferably greater than or equal to 10%. The grafting efficiency is substantially dependent on the grafting agent (V) or (VII) used. After polymerisation to the silicone (acrylate) graft rubber, the aqueous latex is added to hot water in which metal salts have previously been dissolved, such as, for example, calcium chloride or magnesium sulfate. The silicone (acrylate) graft rubber thereby coagulates and can then be separated off.

The methacrylic acid alkyl ester and acrylic acid alkyl ester graft rubbers mentioned as component B) are commercially available. Examples which may be mentioned include: Metablen® SX 005, Metablen® S-2030 and Metablen® SRK 200 from Mitsubishi Rayon Co. Ltd.

Component C

The moulding compositions according to the invention contain as flameproofing agents phosphorus compounds according to formula (VIII)

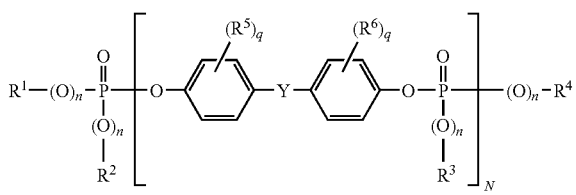

(VIII)

in which the radicals have the meanings given above, and optionally a monophosphorus compound according to formula (VIII), wherein N=0 and $R^1$, $R^2$, $R^4$ and n have the meaning given above.

The phosphorus compounds of component C that are suitable according to the invention are generally known (see, for example, Ullmanns Encyklopädie der Technischen Chemie, Vol. 18, p. 301 ff. 1979; Houben-Weyl, Methoden der Organischen Chemie, Vol. 12/1, p. 43; Beistein, Vol. 6, p. 177).

Preferred substituents $R^1$ to $R^4$ include methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl and naphthyl are particularly preferred.

The aromatic groups $R^1$, $R^2$, $R^3$ and $R^4$ can be substituted by halogen and/or by $C_1$-$C_4$-alkyl. Particularly preferred aryl radicals are cresyl, phenyl, xylenyl, propylphenyl or butylphenyl as well as the brominated and chlorinated derivatives thereof.

$R^5$ and $R^6$, independently of one another, preferably represent methyl or bromine Y preferably represents $C_1$-$C_7$-alkylene, in particular isopropylidene or methylene, particularly preferably isopropylidene.

The substituents n in formula (I), independently of one another, can be 0 or 1; n is preferably 1.

q can be 0, 1, 2, 3 or 4; q is preferably 0, 1 or 2; q is particularly preferably 0.

Mixtures of different phosphates can also be used as component C according to the invention. In that case, N has an average value. Monophosphorus compounds (N=0) can also be present in that mixture. The average value of N can assume values of from 0.1 to 10, preferably from 0.5 to 5, particularly preferably from 0.9 to 3, most preferably from 1.06 to 1.15.

The mean N values can be determined by determining the composition of the phosphate mixture (molecular weight distribution) by a suitable method [gas chromatography (GC), high pressure liquid chromatography (HPLC), gas permeation chromatography (GPC)] and calculating the mean values of N therefrom.

Anti-Dripping Agents D

The compositions according to the invention can contain as anti-dripping agents preferably fluorinated polyolefins D. Fluorinated polyolefins are generally known (see, for example, EP-A 640 655). A commercially available product is, for example, Teflon® 30 N from DuPont.

The fluorinated polyolefins can also be used in the form of a coagulated mixture of emulsions of the fluorinated polyolefins with emulsions of the graft polymers B) or with an emulsion of a copolymer E.1) based preferably on styrene/acrylonitrile, the fluorinated polyolefin in the form of an emulsion being mixed with an emulsion of the graft polymer or copolymer and subsequently coagulated.

The fluorinated polyolefins can also be used in the form of a pre-compound with the graft polymer B) or with a copolymer E.1) based preferably on styrene/acrylonitrile. The fluorinated polyolefins are mixed in the form of a powder with a powder or granules of the graft polymer or copolymer and are compounded in the melt generally at temperatures of from 200 to 330° C. in conventional apparatuses such as internal kneaders, extruders or twin-shaft screws.

The fluorinated polyolefins can also be used in the form of a masterbatch, which is prepared by emulsion polymerisation of at least one monoethylenically unsaturated monomer in the presence of an aqueous dispersion of the fluorinated polyolefin. Preferred monomer components are styrene, acrylonitrile and mixtures thereof. The polymer is used in the form of a pourable powder after acid precipitation and subsequent drying.

The coagulates, pre-compounds and masterbatches usually have solids contents of fluorinated polyolefin of from 5 to 95 wt. %, preferably from 7 to 60 wt. %.

Component E

Component E comprises one or more thermoplastic vinyl (co)polymers E.1 and/or polyalkylene terephthalates E.2.

Suitable vinyl (co)polymers E.1 are polymers of at least one monomer from the group of the vinyl aromatic compounds, vinyl cyanides (unsaturated nitriles), unsaturated carboxylic acids and derivatives (such as anhydrides and imides) of unsaturated carboxylic acids. Particularly suitable are (co)polymers of E.1.1 from 50 to 99 parts by weight, preferably from 60 to 80 parts by weight, of vinyl aromatic compounds and/or vinyl aromatic compounds substituted on the ring (such as styrene, α-methylstyrene, p-methylstyrene, p-chlorostyrene) and E.1.2 from 1 to 50 parts by weight, preferably from 20 to 40 parts by weight, of vinyl cyanides (unsaturated nitriles, such as acrylonitrile and methacrylonitrile) and/or unsaturated carboxylic acids (such as maleic acid) and/or derivatives (such as anhydrides and imides) of unsaturated carboxylic acids (for example maleic anhydride and N-phenylmaleimide).

The vinyl (co)polymers E.1 are resin-like, thermoplastic and rubber-free. Particular preference is given to the copolymer of E.1.1 styrene and E.1.2 acrylonitrile.

The (co)polymers according to E.1 are known and can be prepared by free-radical polymerisation, in particular by emulsion, suspension, solution or mass polymerisation. The (co)polymers preferably have mean molecular weights $M_w$ (weight-average, determined by light scattering or sedimentation) of from 15,000 to 200,000.

The polyalkylene terephthalates of component E.2 are reaction products of aromatic dicarboxylic acids or reactive derivatives thereof, such as dimethyl esters or anhydrides, and aliphatic, cycloaliphatic or araliphatic diols, and mixtures of these reaction products. Preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of ethylene glycol and/or 1,4-butanediol radicals.

The preferred polyalkylene terephthalates can contain, in addition to terephthalic acid radicals, up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid. The preferred polyalkylene terephthalates can contain, in addition to ethylene glycol or 1,4-butanediol radicals, up to 20 mol %, preferably up to 10 mol %, of other aliphatic diols having from 3 to 12 carbon atoms or of cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-A 2 407 674, 2 407 776, 2 715 932).

The polyalkylene terephthalates can be branched by the incorporation of relatively small amounts of tri- or tetrahydric alcohols or of tri- or tetra-basic carboxylic acids, for example according to DE-A 1 900 270 and U.S. Pat. No. 3,692,744. Examples of preferred branching agents are trimesic acid, trimellitic acid, trimethylol-ethane and -propane and pentaerythritol.

Particular preference is given to polyalkylene terephthalates that have been prepared solely from terephthalic acid and reactive derivatives thereof (e.g. dialkyl esters thereof) and ethylene glycol and/or 1,4-butanediol, and mixtures of these polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have an intrinsic viscosity of from 0.4 to 1.5 dl/g, preferably from 0.5 to 1.2 dl/g, measured in phenol/o-dichlorobenzene (1:1 parts by weight) at 25° C. in a Ubbelohde viscometer.

The polyalkylene terephthalates can be prepared according to known methods (see, for example, Kunststoff-Handbuch, Volume VIII, p. 695 ff, Carl-Hanser-Verlag, Munich 1973).

Further Additives F

The moulding compositions according to the invention can comprise at least one of the conventional additives, such as, for example, lubricants and demoulding agents, nucleating agents, antistatics, stabilisers, colourings and pigments, as well as fillers and reinforcing agents.

Component F also includes very finely divided inorganic compounds which are distinguished by an average particle diameter of less than or equal to 200 nm, preferably less than or equal to 150 nm, in particular from 1 to 100 nm. Suitable very finely divided inorganic compounds preferably consist of at least one polar compound of one or more metals of main groups 1 to 5 or of sub-groups 1 to 8 of the periodic system, preferably of main groups 2 to 5 or sub-groups 4 to 8, particularly preferably of main groups 3 to 5 or sub-groups 4 to 8, or of compounds of those metals with at least one element selected from oxygen, hydrogen, sulfur, phosphorus, boron, carbon, nitrogen or silicon. Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates. The very finely divided inorganic compounds preferably consist of oxides, phosphates, hydroxides, preferably of $TiO_2$, $SiO_2$, $SnO_2$, ZnO, ZnS, boehmite, $ZrO_2$, $Al_2O_3$, aluminium phosphates, iron oxides, also TiN, WC, AlO(OH), $Fe_2O_3$, iron oxides, $NaSO_4$, vanadium oxides, zinc borate, silicates such as Al silicates, Mg silicates, one-, two- and three-dimensional silicates and talc. Mixtures and doped compounds can likewise be used. These very finely divided inorganic compounds can further be surface-modified with organic molecules in order to achieve better compatibility with the polymers. Hydrophobic or hydrophilic surfaces can be produced in this manner. Particular preference is given to hydrate-containing aluminium oxides (e.g. boehmite) or $TiO_2$.

Particle size and particle diameter always mean the mean particle diameter $d_{50}$, determined by ultracentrifuge measurements according to W. Scholtan et al., Kolloid-Z. and Z. Polymere 250 (1972), p. 782-796.

The inorganic compounds can be in the form of powders, pastes, sols, dispersions or suspensions. Powders can be obtained from dispersions, sols or suspensions by precipitation.

The inorganic compounds can be incorporated into the thermoplastic moulding compositions according to conventional processes, for example by the direct kneading or extrusion of moulding compositions and the very finely divided inorganic compounds. Preferred processes are the preparation of a masterbatch, for example in flameproofing additives and at least one component of the moulding compositions according to the invention in monomers or solvents, or the co-precipitation of a thermoplastic component and the very finely divided inorganic compounds, for example by the co-precipitation of an aqueous emulsion and the very finely divided inorganic compounds, optionally in the form of dispersions, suspensions, pastes or sols of the very finely divided inorganic materials.

The compositions according to the present invention are prepared by mixing the respective constituents in a known manner and melt-compounding or melt-extruding them at temperatures of from 200° C. to 300° C. in conventional devices such as internal kneaders, extruders and twin-shaft screws. Mixing of the individual constituents can, in known manner, be carried out either in succession or simultaneously, both at about 20° C. (room temperature) and at a higher temperature. Owing to their excellent balance of flame resistance and strength, while at the same time having high ageing stability and high dimensional stability under heat, the thermoplastic compositions and moulding compositions according to the invention are suitable for the production of moulded bodies of any kind. On account of their dimensional stability under heat and their rheological properties, processing temperatures of over 240° C. are preferred.

The invention also provides processes for the preparation of the moulding compositions and the use of the moulding compositions in the production of moulded bodies. The moulding compositions can be processed to moulded bodies by injection moulding, or the moulding compositions can be extruded to sheets or films. The invention further provides the production of moulded bodies from previously produced sheets or films by thermoforming.

The moulded bodies are suitable for the following applications: external vehicle parts or interior fittings for motor vehicles, buses, lorries, motor caravans, track vehicles, aircraft, water craft or other vehicles, cover plates for the construction sector, flat wall elements, partition walls, strips for protecting walls and edges, profiles for electrical installation conduits, cable guides, conductor rail covers, window and door profiles, furniture parts and traffic signs. The moulded bodies are suitable in particular for the following applications: external vehicle parts or interior fittings for passenger vehicles, buses, lorries, motor caravans, track vehicles and aircraft. The moulded bodies are particularly preferably suitable for the production of side walls, cladding and/or covers for airbags and/or for ventilators, side parts and handles or parts of headrests or storage areas of a motor vehicle, bus, lorry or motor caravan.

The Examples which follow serve to illustrate the invention further.

EXAMPLES

Component A-1

Linear polycarbonate based on bisphenol A having a relative solution viscosity of $\eta_{rel}=1.28$ measured in $CH_2Cl_2$ as solvent at 25° C. and a concentration of 0.5 g/100 ml.

Component A-2

Linear polycarbonate based on bisphenol A having a relative solution viscosity of $\eta_{rel}=1.20$ measured in $CH_2Cl_2$ as solvent at 25° C. and a concentration of 0.5 g/100 ml.

Component A-3

Branched polycarbonate based on bisphenol A having a relative solution viscosity of $\eta_{rel}=1.33$ measured in $CH_2Cl_2$ as solvent at 25° C. and a concentration of 0.5 g/100 ml, which has been branched by addition of 0.3 mol % of isatinbiscresol, based on the sum of isatinbiscresol and bisphenol A.

Component B-1

Graft polymer of 15 wt. % of a shell of polymethyl methacrylate on 85 wt. % of a graft base of a silicone-acrylate composite rubber.

Component B-2 (Comparison)

Graft polymer of 25 wt. % of a shell of SAN (weight ratio styrene to acrylonitrile=72:28) on 75% of a graft base of polybutadiene rubber.

Component B-3 (Comparison)

Graft polymer of 20 wt. % of a shell of polymethyl methacrylate (PMMA) on 80 wt. % of a graft base of butyl acrylate rubber.

Component C

Bisphenol-A-based oligophosphate (Reofoss BAPP) according to formula (VIIIa)

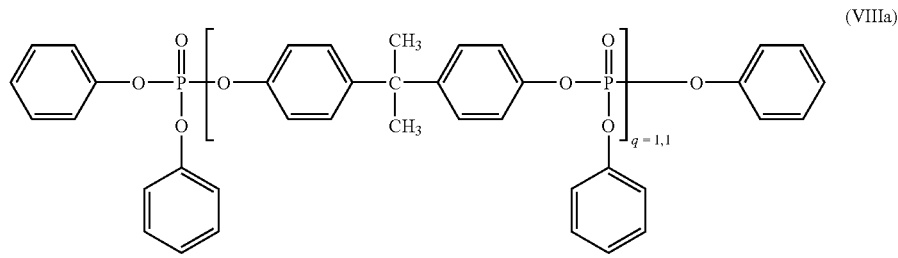

(VIIIa)

Component D

Polytetrafluoroethylene powder, CFP 6000 N, DuPont.

Component F

F-1: Pentaerythritol tetrastearate as lubricant/demoulding agent
F-2: Phosphite stabiliser, Irganox® B 900, Ciba Speciality Chemicals, Basle, Switzerland.
F-3: Pural® 200, an aluminium oxide hydroxide from Sasol, Hamburg, Germany.

TABLE

Compositions and their properties

| | 1 | 2 | 3 | 4 (comp.) | 5 (comp.) | 6 (comp.) | 7 (comp.) |
|---|---|---|---|---|---|---|---|
| Composition [parts by weight] | | | | | | | |
| A-1 | 55.0 | | | 55.0 | 55.0 | 55.0 | 55.0 |
| A-2 | 30.0 | 42.5 | | 30.0 | 30.0 | 30.0 | 30.0 |
| A-3 | | 42.5 | 85.0 | | | | |
| B-1 | 9.0 | 9.0 | 9.0 | | | 11.0 | 8.0 |
| B-2 | | | | 9.0 | | | |
| B-3 | | | | | 9.0 | | |
| C | 6.0 | 6.0 | 6.0 | 6.0 | 6.0 | 4.0 | 7.0 |
| D | 0.4 | 0.4 | 0.4 | 0.4 | 0.4 | 0.4 | 0.4 |
| F-1 | 0.4 | 0.4 | 0.4 | 0.4 | 0.4 | 0.4 | 0.4 |
| F-2 | 0.1 | 0.1 | 0.1 | 0.1 | 0.1 | 0.1 | 0.1 |
| F-3 | 0.4 | 0.4 | 0.4 | 0.4 | 0.4 | 0.4 | 0.4 |
| Weight ratio of component B to P content from component C. | 17 | 17 | 17 | 17 | 17 | 31 | 13 |
| Properties | | | | | | | |
| Transition temperature tough/brittle Notched impact test | −15° C. | −25° C. | −35° C. | −15° C. | +5° C. | −25° C. | −5° C. |
| Puncture behaviour −30° C. | tough | tough | tough | tough | tough | tough | tough |
| Vicat B120 [° C.] | 121 | yes | yes | 120 | 121 | 129 | 120 |
| Fire behaviour UL 94V (2.0 mm) | V0 | V0 | V0 | V0 | V1 | V1 | V0 |
| Double-bond-free rubber | yes | yes | yes | no | yes | yes | yes |

The present examples show that only compositions 1 to 3 according to the invention exhibit the advantageous combination of good strength and high dimensional stability under heat together with excellent flame resistance with an ageing-resistant rubber. Comparison example 4 contains a component B having a butadiene-based graft rubber base and has only inadequate ageing stability. Comparison example 5 contains a component B having a graft rubber base of acrylate rubber, and this composition does not fulfil the high demands made in respect of low-temperature strength and flame resistance. Disadvantageous ratios of component B (impact modifier) to phosphorus content from component D lead either to inadequate flame protection (comparison example 6) or to poorer strength (comparison example 7).

The invention claimed is:
1. A composition comprising
A) from 77 to 90 parts by weight (based on the sum of components A+B+C) of linear and/or branched aromatic polycarbonate and/or aromatic polyester carbonate,
B) from 6 to 12 parts by weight (based on the sum of components A+B+C) of graft polymer having
B.1 from 5 to 30 wt. % (in each case based on the graft polymer B) of a shell of at least one vinyl monomer and
B.2 from 95 to 70 wt. % (in each case based on the graft polymer B) of one or more graft bases of silicone-acrylate composite rubber,

C) from 4 to 10 parts by weight (based on the sum of components A+B+C) of phosphorus compounds according to formula (VIII)

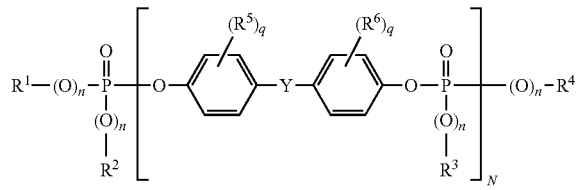

wherein $R^1$, $R^2$, $R^3$ and $R^4$, independently of one another, represent optionally halo-substituted $C_1$-$C_8$-alkyl, in each case optionally halo- and/or alkyl-substituted $C_5$-$C_6$-cycloalkyl, $C_6$-$C_{10}$-aryl or $C_7$-$C_{12}$-aralkyl, the substituents n independently of one another represent 0 or 1, the substituents q independently of one another represent 0, 1, 2, 3 or 4, N represents from 0.1 to 10, $R^5$ and $R^6$, independently of one another, represent $C_1$-$C_4$-alkyl, or halogen, and Y represents a single bond, $C_1$-$C_7$-alkylidene, $C_1$-$C_7$-alkylene, $C_5$-$C_{12}$-cyclo-alkylene, $C_5$-$C_{12}$-cycloalkylidene, —O—, —S—, —SO—, —SO$_2$— or —CO—, D) from 0 to 3 parts by weight (based on the sum of components A+B+C) of at least one anti-dripping agent, and E) from 0 to 3 parts by weight (based on the sum of components A+B+C) of thermoplastic vinyl (co)polymer (E.1) and/or polyalkylene terephthalate (E.2); and F) from 0 to 20 parts by weight (based on the sum of components A+B+C) of at least one further additive, wherein the weight ratio of component B to the phosphorus content from component C is in a range of from 16 to 22 to 1, and wherein the composition is free of rubber-free polyalkyl (alkyl)acrylate wherein the composition has a fire behavior UL94V of V0 and a transition temperature tough/brittle notched impact test of no greater than −15° C.

2. A composition according to claim 1 comprising from 8.5 to 10 parts by weight (based on the sum of components A+B+C) of component B.

3. A composition according to claim 1, wherein the monomers B.1 are at least one selected from the group consisting of methyl methacrylate, ethyl methacrylate, 2-ethylhexyl methacrylate, allyl methacrylate, methyl acrylate, ethyl acrylate, n-butyl acrylate and tert-butyl acrylate.

4. A composition according to claim 1 comprising from 5.2 to 6.5 parts by weight (based on the sum of components A+B+C) of component C.

5. A composition according to claim 1 comprising as component C a mixture of a monophosphate and an oligophosphate according to formula (VIII), wherein the average value of N is from 0.1 to 10.

6. A composition according to claim 1, wherein N is from 1.06 to 1.15.

7. A composition according to claim 1 comprising from 0.1 to 0.6 parts by weight (based on the sum of components A+B+C) of component D.

8. A composition according to claim 1, wherein the composition is free of thermoplastic vinyl (co)polymers (E.1) and/or polyalkylene terephthalates (E.2).

9. A composition according to claim 1 comprising from 0.1 to 10 parts by weight (based on the sum of components A+B+C) of component F.

10. A composition according to claim 1 comprising as component F at least one additive selected from the group consisting of lubricants and demoulding agents, nucleating agents, antistatics, stabilisers, colourings, pigments, fillers, reinforcing agents and very finely divided inorganic compounds, wherein the very finely divided inorganic compounds have an average particle diameter of less than or equal to 200 nm.

11. A composition according to claim 1, wherein the weight ratio of component B to the phosphorus content from component C is in a range of from 17 to 19 to 1.

12. An injection-moulded or thermoformed moulded body formed from a composition according to claim 1.

13. Moulded body comprising a composition according to claim 1.

14. Moulded body according to claim 13, wherein the moulded body is part of a motor vehicle, bus, lorry, motor caravan, track vehicle, water craft or other vehicle or is a cover plate for the construction sector, flat wall element, partition wall, strip for protecting walls and edges, profile for electrical installation conduits, cable guide, conductor rail cover, window and door profile, furniture part or part of a traffic sign.

15. Moulded body according to claim 13, wherein the moulded body is a side wall, cladding or a cover for an airbag or a ventilator, a side part, a handle or part of a headrest or a storage area of a motor vehicle, bus, lorry or motor caravan.

16. A composition comprising

A) from 77 to 90 parts by weight (based on the sum of components A+B+C) of linear polycarbonate, B) from 6 to 12 parts by weight (based on the sum of components A+B+C) of graft polymer having B.1 from 5 to 30 wt. % (in each case based on the graft polymer B) of a shell of at least one vinyl monomer and B.2 from 95 to 70 wt. % (in each case based on the graft polymer B) of one or more graft bases of silicone-acrylate composite rubber, C) from 4 to 10 parts by weight (based on the sum of components A+B+C) of phosphorus compounds according to formula (VIII)

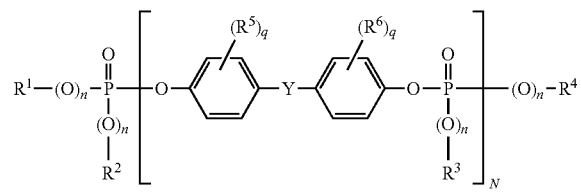

wherein $R^1$, $R^2$, $R^3$ and $R^4$, independently of one another, represent optionally halo-substituted $C_1$-$C_8$-alkyl, in each case optionally halo- and/or alkyl-substituted $C_5$-$C_6$-cycloalkyl, $C_6$-$C_{10}$-aryl or $C_7$-$C_{12}$-aralkyl, the substituents n independently of one another represent 0 or 1,
the substituents q independently of one another represent 0, 1, 2, 3 or 4,
N represents from 0.1 to 10,
$R^5$ and $R^6$, independently of one another, represent $C_1$-$C_4$-alkyl, or halogen, and
Y represents a single bond, $C_1$-$C_7$-alkylidene, $C_1$-$C_7$-alkylene, $C_5$-$C_{12}$-cyclo-alkylene, $C_5$-$C_{12}$-cycloalkylidene, —O—, —S—, —SO—, —SO$_2$— or —CO—,
D) from 0 to 3 parts by weight (based on the sum of components A+B+C) of anti-dripping agents, and
E) from 0 to 3 parts by weight (based on the sum of components A+B+C) of thermoplastic vinyl (co)polymer (E.1) and/or polyalkylene terephthalate (E.2); and
F) from 0 to 20 parts by weight (based on the sum of components A+B+C) of at least one further additive,
wherein the weight ratio of component B to the phosphorus content from component C is in a range of from 16 to 22 to 1, and
wherein the composition is free of rubber-free polyalkyl (alkyl)acrylate wherein the composition has
a fire behavior UL94V of V0 and a transition temperature tough/brittle notched impact test of no greater than −15° C.

17. A composition according to claim 16, wherein present the composition is free of thermoplastic vinyl (co)polymers (E.1) and polyalkylene terephthalates (E.2).

18. A composition consisting of
A) from 77 to 90 parts by weight (based on the sum of components A+B+C) of linear and/or branched aromatic polycarbonate and/or aromatic polyester carbonate,
B) from 6 to 12 parts by weight (based on the sum of components A+B+C) of graft polymer having
B.1 from 5 to 30 wt. % (in each case based on the graft polymer B) of a shell of at least one vinyl monomer and
B.2 from 95 to 70 wt. % (in each case based on the graft polymer B) of one or more graft bases of silicone-acrylate composite rubber,
C) from 4 to 10 parts by weight (based on the sum of components A+B+C) of phosphorus compounds according to formula (VIII)

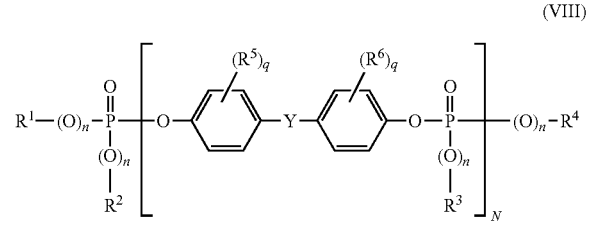

(VIII)

wherein
$R^1$, $R^2$, $R^3$ and $R^4$, independently of one another, represent optionally halo-substituted $C_1$-$C_8$-alkyl, in each case optionally halo- and/or alkyl-substituted $C_5$-$C_6$-cycloalkyl, $C_6$-$C_{10}$-aryl or $C_7$-$C_{12}$-aralkyl,
the substituents n independently of one another represent 0 or 1,
the substituents q independently of one another represent 0, 1, 2, 3 or 4,
N represents from 0.1 to 10,
$R^5$ and $R^6$, independently of one another, represent $C_1$-$C_4$-alkyl, or halogen, and
Y represents a single bond, $C_1$-$C_7$-alkylidene, $C_1$-$C_7$-alkylene, $C_5$-$C_{12}$-cyclo-alkylene, $C_5$-$C_{12}$-cycloalkylidene, —O—, —S—, —SO—, —SO$_2$— or —CO—,
D) from 0 to 3 parts by weight (based on the sum of components A+B+C) of anti-dripping agents, and
E) from 0 to 3 parts by weight (based on the sum of components A+B+C) of thermoplastic vinyl (co)polymer (E.1) and/or polyalkylene terephthalate (E.2); and
F) from 0 to 20 parts by weight (based on the sum of components A+B+C) of at least one further additive,
wherein the weight ratio of component B to the phosphorus content from component C is in a range of from 16 to 22 to 1, and
wherein the composition is free of rubber-free polyalkyl (alkyl)acrylate wherein the composition has
a fire behavior UL94V of V0 and a transition temperature tough/brittle notched impact test of no greater than −15° C.

19. A composition consisting of
A) from 77 to 90 parts by weight (based on the sum of components A+B+C) of linear polycarbonate,
B) from 6 to 12 parts by weight (based on the sum of components A+B+C) of graft polymer having
B.1 from 5 to 30 wt. % (in each case based on the graft polymer B) of a shell of at least one vinyl monomer and
B.2 from 95 to 70 wt. % (in each case based on the graft polymer B) of one or more graft bases of silicone-acrylate composite rubber,
C) from 4 to 10 parts by weight (based on the sum of components A+B+C) of phosphorus compounds according to formula (VIII)

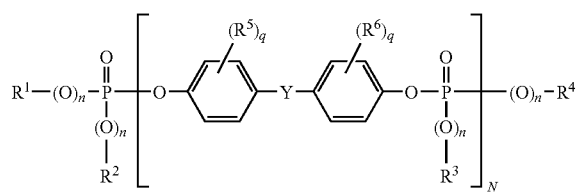

(VIII)

wherein
$R^1$, $R^2$, $R^3$ and $R^4$, independently of one another, represent optionally halo-substituted $C_1$-$C_8$-alkyl, in each case optionally halo- and/or alkyl-substituted $C_5$-$C_6$-cycloalkyl, $C_6$-$C_{10}$-aryl or $C_7$-$C_{12}$-aralkyl,
the substituents n independently of one another represent 0 or 1,
the substituents q independently of one another represent 0, 1, 2, 3 or 4,
N represents from 0.1 to 10,
$R^5$ and $R^6$, independently of one another, represent $C_1$-$C_4$-alkyl, or halogen, and
Y represents a single bond, $C_1$-$C_7$-alkylidene, $C_1$-$C_7$-alkylene, $C_5$-$C_{12}$-cyclo-alkylene, $C_5$-$C_{12}$-cycloalkylidene, —O—, —S—, —SO—, —SO$_2$— or —CO—,
D) from 0 to 3 parts by weight (based on the sum of components A+B+C) of anti-dripping agents, and
F) from 0 to 20 parts by weight (based on the sum of components A+B+C) of at least one further additive, wherein the weight ratio of component B to the phosphorus content from component C is in a range of from 16 to 22 to 1, wherein the composition is free of rubber-free polyalkyl (alkyl)acrylate, and wherein the composition is free of thermoplastic vinyl (co)polymers (E.1) and polyalkylene terephthalates (E.2) wherein the composition has a fire behavior UL94V of V0 and a transition temperature tough/brittle notched impact test of no greater than −15° C.

* * * * *